(12) United States Patent
Drazic et al.

(10) Patent No.: US 6,312,143 B1
(45) Date of Patent: Nov. 6, 2001

(54) ILLUMINATION DEVICE WITH LIGHT RESHAPING ELEMENT FOR AN OPTICAL VALVE

(75) Inventors: Valter Drazic, Betton (FR); Eric Marcellin-Dibon, Coulsdon (GB); Khaled Sarayeddine, Nouvoitou (FR)

(73) Assignee: Thomson Multimedia S.A., Boulogne (FR)

( * ) Notice: Subject to any disclaimer, the term of this patent is extended or adjusted under 35 U.S.C. 154(b) by 0 days.

(21) Appl. No.: 09/034,831

(22) Filed: Mar. 4, 1998

(30) Foreign Application Priority Data

Mar. 13, 1997 (FR) .................................................. 97 02978

(51) Int. Cl.[7] ............................... F21V 13/04; F21V 5/00
(52) U.S. Cl. ........................... 362/268; 362/308; 362/331
(58) Field of Search .......................... 349/66, 67; 353/37, 353/38, 102; 359/1; 362/268, 293, 307, 308, 309, 347, 331

(56) References Cited

U.S. PATENT DOCUMENTS

| 5,359,440 | 10/1994 | Hamada et al. | 359/41 |
|---|---|---|---|
| 5,418,583 * | 5/1995 | Masumoto | 362/309 |
| 5,541,746 | 7/1996 | Hamagishi et al. | 359/49 |
| 5,649,753 * | 7/1997 | Masumoto | 353/102 |
| 5,758,940 * | 6/1998 | Ogino | 353/38 |
| 5,798,805 * | 8/1998 | Ooi | 349/10 |
| 5,808,759 * | 9/1998 | Okamori | 359/15 |
| 5,844,638 * | 12/1998 | Ooi et al. | 362/308 |
| 5,911,489 * | 6/1999 | Watanabe | 353/98 |
| 6,092,901 * | 7/2000 | Hashizume et al. | 362/331 |

FOREIGN PATENT DOCUMENTS

| 0571088A2 | 11/1993 | (EP) | F21V/8/00 |
|---|---|---|---|
| 0746164A2 | 12/1996 | (EP) | H04N/9/31 |

* cited by examiner

*Primary Examiner*—Sandra O'Shea
*Assistant Examiner*—Peggy A Neils
(74) *Attorney, Agent, or Firm*—Joseph S. Tripoli; Joseph J. Laks; Joseph J. Kolodka

(57) ABSTRACT

The present invention relates to a device for illuminating at least one surface, which includes a light source and a reflector in order to focus the light rays emitted by the source. In said device, the focal plane of the reflector lies between the light source and the said surface and it includes, positioned close to the focal plane of the reflector, a means forming a second light source.

14 Claims, 3 Drawing Sheets

TOTAL RADIANT FLUX TRANSMITTED

TOTAL RADIANT FLUX TRANSMITTED

ILLUMINATION DEVICE WITH LIGHT RESHAPING ELEMENT FOR AN OPTICAL VALVE

BACKGROUND OF THE INVENTION

The present invention relates to an illumination device, more particularly an illumination device for a projection or display apparatus and especially an illumination device of an optical valve such as a liquid-crystal screen.

DESCRIPTION OF THE PRIOR ART

A projection apparatus essentially comprises an illumination device making it possible to project at least one image such as that produced by means of an optical valve, more particularly by means of a liquid-crystal screen. In this case, the image generated is projected onto a screen by a projection optic. In the case of a display device, the image is displayed directly on the liquid-crystal screen. A known illumination device used for this type of apparatus includes, as shown in FIG. 1, a lamp 1, which may be an arc lamp, a halogen lamp, a neon lamp or a filament lamp, and a reflector 2, preferably a parabolic reflector, in order to reflect the light and focus the light rays onto a surface such as a liquid-crystal screen 3. This type of illumination device has a number of drawbacks. This is because the shape of the beam reflected by the parabolic reflector is different from that of the optical valve onto which it is directed. However, an optical valve requires a uniform and a strong illumination. With a parabolic reflector, there may therefore be considerable light losses which may be at least 45% for the illumination of a valve of rectangular shape, especially a valve of the 16/9 type. Moreover, when the optical valve is a liquid-crystal screen, this must be provided with a polarizer and with a polarization analyser since the source is unpolarized. This leads to an additional loss which may be as much as 60 to 70%. Consequently, with an illumination device of this type and as shown in FIG. 2, a low illumination uniformity and a light efficiency of approximately 30% are observed. The average illumination aperture is approximately ±5° and the solid angle is not optimized. This means that the light distribution is not uniform within the solid angle.

SUMMARY OF THE INVENTION

The object of the present invention is to remedy these drawbacks by providing a novel illumination device making it possible to obtain an illumination shape which corresponds to the format of the surface to be illuminated and gives a high illumination uniformity.

The subject of the present invention is a device for illuminating at least one surface, which includes a light source and a reflector in order to focus the light rays emitted by the source, characterized in that the focal plane of the reflector lies between the light source and the said surface and in that it includes, positioned close to the focal plane of the reflector, a means forming a second light source.

According to one particular embodiment, the reflector has an ellipsoidal shape and the surface receiving the illumination consists of an optical valve such as a liquid-crystal screen, the optical valve being associated, preferably on the entrance side, with a field lens which collimates the beam emanating from the second light source.

According to a first embodiment, the means forming a second light source consists of a microlens array optionally followed by a thick lens.

According to a second embodiment, the means forming a second light source consists of a diffuser optionally followed by a thick lens.

Other features and advantages of the present invention will appear on reading the detailed description of several embodiments, this description being given with reference to the drawings appended hereto, in which:

DESCRIPTION OF PREFERRED EMBODIMENTS

To simplify the description, identical elements in the figures bear the same references.

Figure 1:
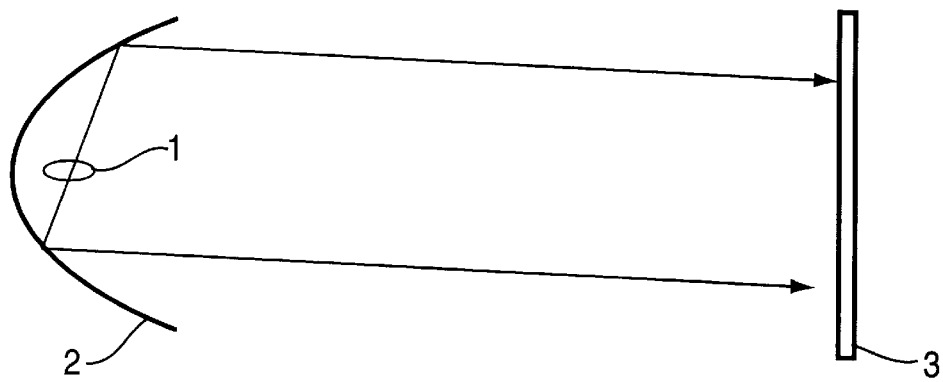
FIG. 1 already described is a diagrammatic view of an illumination system according to the prior art.
Figure 2:
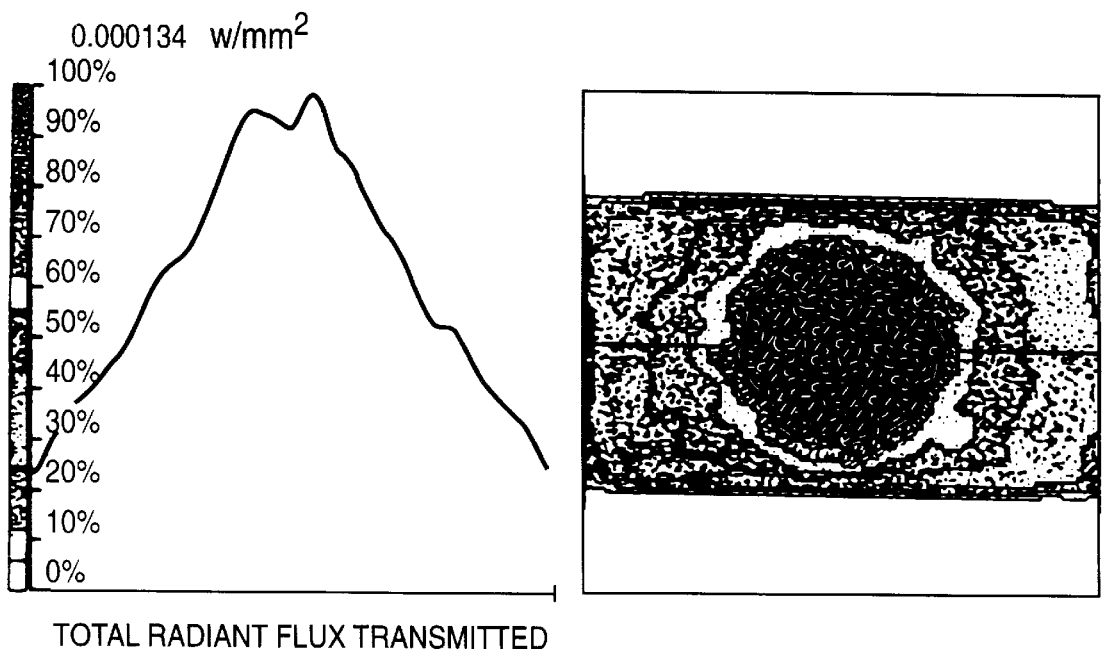
FIG. 2 is a curve associated with an optical ray-tracing simulation giving the light distribution in the plane of the liquid-crystal screen of the illumination device of FIG. 1.
Figure 3:
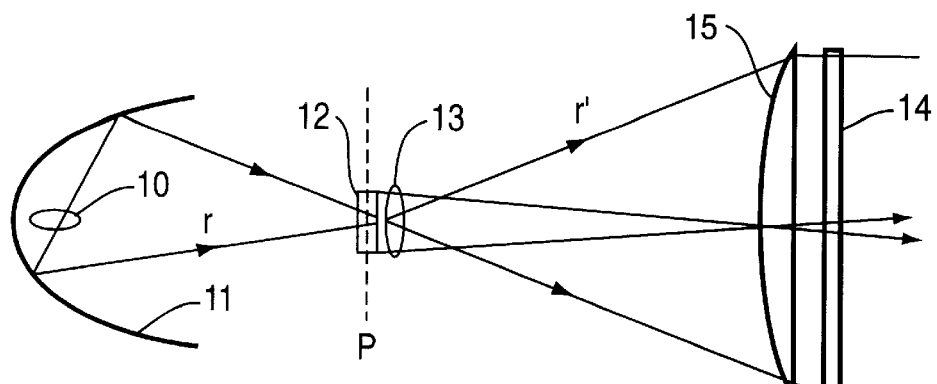
FIG. 3 is a diagrammatic cross-sectional view of an illumination device according to the present invention.

FIG. 3 shows an illumination device provided with a first embodiment of a means forming a second light source. In FIG. 3, the reference 10 indicates a lamp which, in the embodiment shown, is a lamp of the metal-halide type. The reference 11 indicates a reflector, more particularly an elliptical reflector, which sends the rays r back to a focal point lying in a focal plane P.

In accordance with the present invention, a microlens array 12 is positioned close to this focal plane. Throughout the document, microlens array should be understood to mean a structure consisting of small lenses which may be arranged in a regular or non-regular array, the shape of the microlenses and their numerical aperture being fitted to certain parameters such as the format of the surface to be illuminated, especially the format of the liquid-crystal screen, the characteristics of the light source 10 and the illumination uniformity. The dimensions of the microlenses are between 2 mm and less than 50 μm. The microlens array 12 is associated with a thick lens 13 whose function will be explained below. This combination acts as a secondary light source and the rays r' emitted by this source illuminate a surface which, in the embodiment shown, consists of an optical valve 14, more particularly a liquid-crystal screen. In the embodiment of FIG. 3, a field lens 15 is positioned in front of the liquid-crystal screen 14, the function of this field lens being to collimate the light emanating from the microlens array 12/lens 13 combination onto the liquid-crystal screen 14. When the liquid-crystal screen is used in a television-type projection system, it has a rectangular shape. Consequently, the microlens array preferably consists of rectangular microlenses.

The principle of operation of the system shown in FIG. 3 will be explained in a little more detail.

Thus, when a rectangular microlens array is positioned close to the focal plane of an elliptical reflector, such as the reflector 11, followed by a thick lens 13, it is possible to illuminate the liquid-crystal screen 14 with the correct format and with good uniformity. This is because the rectangular format, preferably slightly greater than that of the liquid-crystal screen of the microlens array, acts as a light-shaping element. The image of each microlens is amplified over a large area of the liquid-crystal screen. The contributions of each microlens are thus superposed and/or juxtaposed in order to give a uniform illumination with a format corresponding to that of the liquid-crystal screen. Moreover, in order to avoid light losses and according to another feature of the present invention, the f-number of the microlens array is chosen to be of the same order as the f-number of the field lens 15, provided in front of the liquid-crystal screen 14 and which collimates the light coming from the new point source. In addition, the cone angle of the illumination falling on the microlenses may also be adjusted so as to obtain the best compromise between as small as possible a decrease in the image of the arc lamp and a decrease in the illumination cone angle in order to avoid the light losses within the f-number of the microlens array. These two conditions may be slightly modified depending on the shape of the image of the light source and also depending on the uniformity and efficiency which it is desired to obtain.

By way of example, for a 16/9 format liquid-crystal screen having dimensions of 90 mm×50 mm, a spherical-curvature microlens array is used, the microlenses being rectangular and having dimensions of 210×80 μm and a focal length of approximately 300 μm in air. The microlens array is followed by a thick lens, namely a lens having a thickness of approximately 10 mm and a focal length of 50 mm. The field lens is an aspheric lens and has a focal length of approximately 160 mm.

Figure 4:
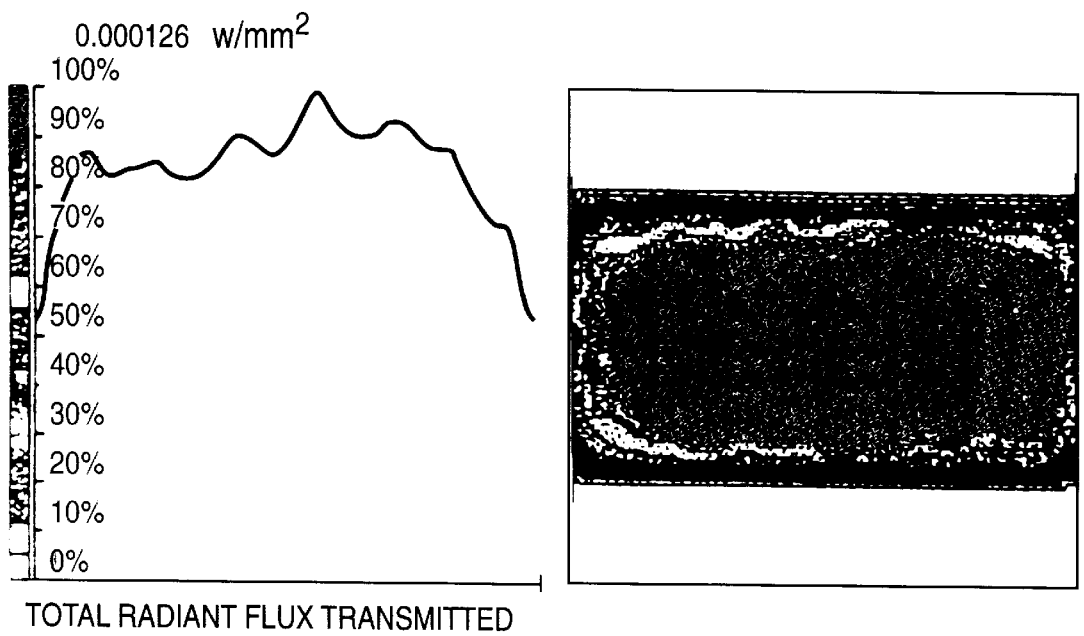
FIG. 4 shows a curve associated with an optical ray-tracing simulation giving the light distribution in the plane of the liquid-crystal screen of the device of FIG. 3.

The simulations of the above system have given the curves shown in FIG. 4. This figure shows the light distribution in the plane of the liquid-crystal screen. An efficiency of approximately 40% is obtained. In this case, the light distribution within the solid angle is optimized, which means that the solid angle is completely filled by the light beam and has no dead area.

Figure 5:
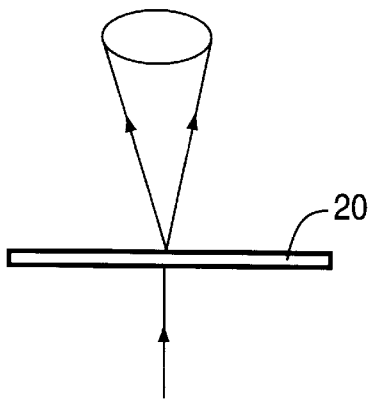
FIG. 5 is a diagrammatic view of a second means forming a second source.

According to a second embodiment of the present invention, instead of a microlens array in order to produce the means forming a second light source, a diffuser 20 as shown in FIG. 5 may be used. This diffuser may be of the holographic type. In this case, the hologram may be a volume hologram or a surface hologram. For cost reasons, it is preferred to use a surface hologram. Moreover, the diffuser may also be produced by means of a random arrangement of microlenses or of microstructures having a known macroscopic scattering lobe. In this case, the scattering lobe must have a numerical aperture close to that of the incident beam so as not to degrade the extent of the beam, but the diffuser must not have a lobe which is axisymmetric so as not to alter the illumination format. Preferably, the scattering lobe is elliptical and the scattering angle is approximately ±20° in the horizontal and ±10° in the vertical in order to obtain an illumination format in the plane of the liquid-crystal screen pretty much similar to 16/9.

The illumination devices described above have many advantages; in particular, they are composed of few elements, which means that the Fresnel losses are small. In addition, the uniformity obtained is approximately 95%, this uniformity depending on the distribution of the light source, on the number of microlenses and on the f-number of the microlenses. The colour uniformity obtained over the entire screen is also high. Furthermore, the illumination aperture can be controlled by shutting off the image of the light source.

Figure 6A:
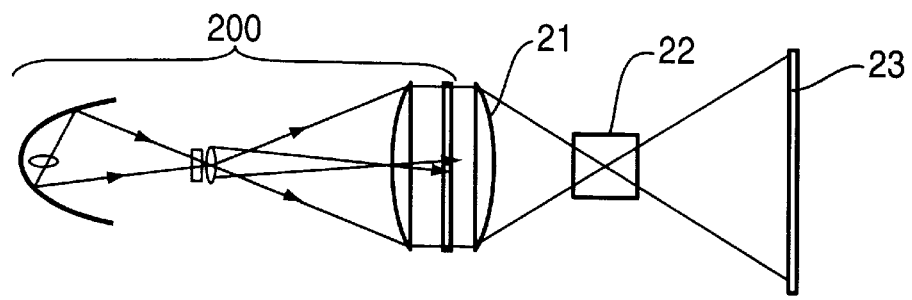
FIGS. 6a and 6b are diagrammatic views showing respectively a monochrome projection device and a trichrome projection device using an illumination device according to the embodiment of FIG. 3.
Figure 6B:
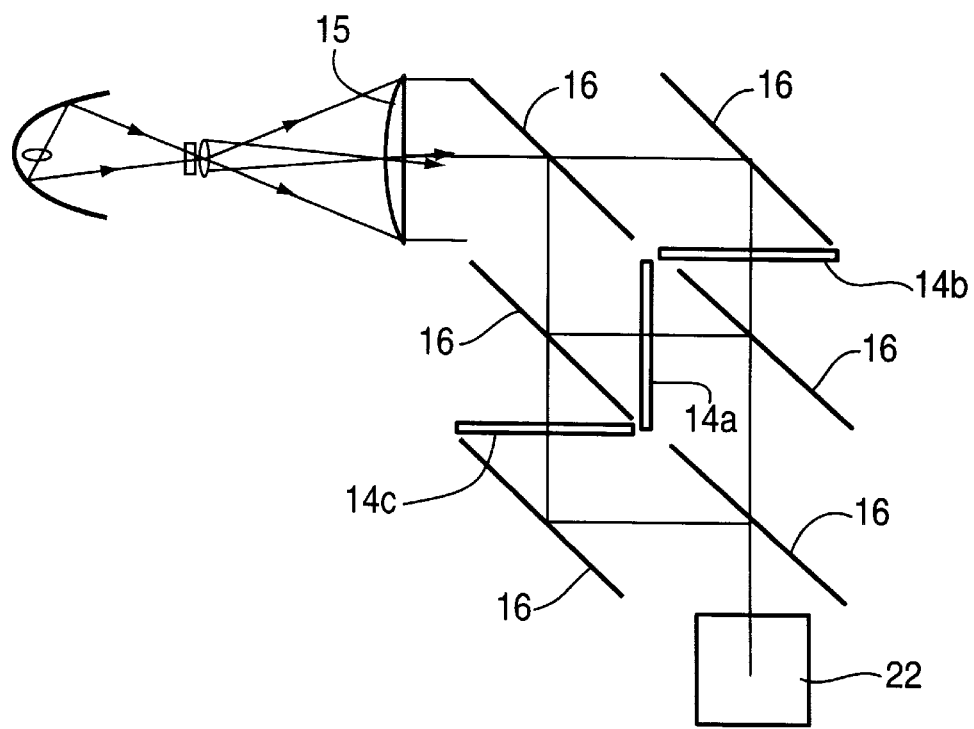

As shown in FIGS. 6a and 6b, this illumination device can be used with projection systems using a single liquid-crystal screen (monovalve), as shown in FIG. 6a. In this case, the device of FIG. 3 indicated by 200 is associated with a focusing lens 21 which directs the light beam onto a projection lens 22 and then onto a projection screen 23.

According to the present invention, the illumination device can also be used in projection systems having several liquid-crystal screens (tri-valve), as shown in FIG. 6b. In this case, three screens 14a, 14b, 14c are associated with mirrors 16, arranged in a manner known by those skilled in the art, on the exit side of the field lens 15 and direct the light beams onto a projection lens 22, as in the embodiment above.

The present invention may be modified without departing from the scope of the claims below. The means forming a second source, consisting either of a microlens array or a diffuser, may be used without a field lens.

What is claimed is:

1. Device for illuminating at least an optical valve comprising:

a light source, a reflector for focusing light rays emitted by said light source, said reflector having a focal point lying between said light source and a surface of an optical valve, a microlens array having a format adapted to that of said optical valve to be illuminated and being positioned in proximity to the focal point of said reflector, a thick lens associated to the microlens array to form a second light source, and a field lens interposed between said thick lens and said optical valve.

2. Device according to claim 1, wherein said format comprises a planar pattern related to the planar format of where said optical valve is to be illuminated.

3. Device according to claim 1, wherein an f-number of the mricolens array of the same order as an f-number of the field lens.

4. Device according to claim 1, wherein the microlens array is followed by a thick lens.

5. Device according to claim 1, wherein the reflector is of an ellipsoidal shape.

6. Device according to claim 1, wherein the optical valve is a liquid-crystal screen.

7. Device according to claim 1, wherein said device is used in a monovalve-type or trivalve-type projection device.

8. Device for illuminating at least an optical valve including a light source, a reflector for focusing light rays emitted by said light source, said reflector having a focal point lying between said light source and a surface of an optical valve, a diffuser proximal to said focal point of said reflector, a thick lens associated to the diffuser to form a second light source, and a field lens between said thick lens and an entrance side of said optical valve.

9. Device according to claim 8, wherein the diffuser comprises a scattering lobe having a numerical aperture close to that of light rays incident on the diffuser.

10. Device according to claim 8, wherein the diffuser comprises an element selected from the group consisting of volume holograms, surface holograms, and a random arrangement of microlenses or of microstructures having a known macroscopic scattering lobe.

11. Device according to claim 8, wherein the reflector is of ellipsoidal shape.

12. Device according to claim 8, wherein the optical valve is a liquid-crystal screen.

13. Device according to claim 8, wherein said device is used in a monovalve-type or a trivalve-type projection device.

14. An illuminating device comprising:
an illumination source,
a reflector for focusing light rays from said illumination source onto a focal point between said illuminator and an optical valve,
a light shaping element proximal to said focal point for converting said light rays having a first spread format related to said reflector to a second spread format for said optical valve, said light shaping being associated with a thick lens and, a collimator between said thick lens and said optical valve.

\* \* \* \* \*